United States Patent
Lee et al.

(10) Patent No.: US 8,948,702 B2
(45) Date of Patent: Feb. 3, 2015

(54) ANTENNA SYSTEM AND METHOD FOR OPTIMIZING AN RF SIGNAL

(75) Inventors: Ming Lee, Ypsilanti, MI (US); Wladimiro Villarroel, Ypsilanti, MI (US); Kwan-ho Lee, Ann Arbor, MI (US); Yasutaka Horiki, Ypsilanti, MI (US)

(73) Assignee: AGC Automotive Americas R&D, Inc., Ypsilanti, MI (US)

( * ) Notice: Subject to any disclaimer, the term of this patent is extended or adjusted under 35 U.S.C. 154(b) by 302 days.

(21) Appl. No.: 13/378,280

(22) PCT Filed: Jun. 15, 2010

(86) PCT No.: PCT/US2010/038669
§ 371 (c)(1),
(2), (4) Date: Dec. 14, 2011

(87) PCT Pub. No.: WO2010/147985
PCT Pub. Date: Dec. 23, 2010

(65) Prior Publication Data
US 2012/0108178 A1    May 3, 2012

Related U.S. Application Data

(60) Provisional application No. 61/268,665, filed on Jun. 15, 2009, provisional application No. 61/268,689, (Continued)

(51) Int. Cl.
*H04B 17/00*    (2006.01)
*H01Q 1/12*    (2006.01)
(Continued)

(52) U.S. Cl.
CPC ......... *H04B 17/0055* (2013.01); *H01Q 1/1271* (2013.01); *H01Q 1/325* (2013.01);
(Continued)

(58) Field of Classification Search
CPC ............ H04B 17/00; H04B 1/00; H04K 1/10; H04N 5/00
USPC ........... 455/67.11, 63.1, 67.16, 276.1, 277.2, 455/270, 272, 273; 375/347, 349
See application file for complete search history.

(56) References Cited

U.S. PATENT DOCUMENTS 3,177,489 A    4/1965   Saltzberg
3,359,555 A    12/1967   Taylor
(Continued)

FOREIGN PATENT DOCUMENTS

EP    1032073 A2    8/2000
EP    1091447 A1    4/2001
(Continued)

OTHER PUBLICATIONS

International Search Report for Application No. PCT/US2010/038669 dated Oct. 26, 2010, 4 pages.
(Continued)

*Primary Examiner* — Nguyen Vo
*Assistant Examiner* — Ralph H Justus
(74) *Attorney, Agent, or Firm* — Howard & Howard Attorneys PLLC

(57) ABSTRACT

An antenna system and method utilize an evaluation branch circuit and an implementation branch circuit. These circuits are each connected to both a first antenna input and a second antenna input. An output of the evaluation branch circuit is in communication with a controller while an output of the implementation branch circuit is in communication with a receiver. Each branch circuit includes at least one signal conditioner to change an electrical characteristic of RF signals received from antennas via the antenna inputs. The evaluation branch circuit, controlled by the controller, changes the electrical characteristics of the RF signals in a variety of different ways to discover an optimized evaluation RF signal. Once the optimized evaluation RF signal is determined, the implementation branch circuit is controlled, by the controller, to produce an optimized implementation RF signal in accordance with that discovered by the evaluation branch circuit.

12 Claims, 5 Drawing Sheets

Related U.S. Application Data filed on Jun. 15, 2009, provisional application No. 61/268,673, filed on Jun. 15, 2009, provisional application No. 61/268,662, filed on Jun. 15, 2009, provisional application No. 61/268,674, filed on Jun. 15, 2009, provisional application No. 61/268,663, filed on Jun. 15, 2009.

(51) Int. Cl.
  *H01Q 1/32* (2006.01)
  *H01Q 3/26* (2006.01)
  *H01Q 3/34* (2006.01)
  *H04B 7/00* (2006.01)
  *H04B 7/08* (2006.01)
  *H04B 7/10* (2006.01)

(52) U.S. Cl.
  CPC .............. *H01Q 3/2605* (2013.01); *H01Q 3/34* (2013.01); *H04B 7/002* (2013.01); *H04B 7/0848* (2013.01); *H04B 7/0857* (2013.01); *H04B 7/086* (2013.01); *H04B 7/10* (2013.01)
  USPC ........ 455/67.11; 455/140; 455/132; 375/144; 375/148

(56) References Cited

U.S. PATENT DOCUMENTS

| | | |
|---|---|---|
| 3,603,886 A | 9/1971 | Norrs |
| 3,670,335 A | 6/1972 | Hirsch |
| 3,870,996 A | 3/1975 | Miller |
| 3,964,065 A | 6/1976 | Roberts et al. |
| 4,051,474 A | 9/1977 | Mack et al. |
| 4,057,803 A | 11/1977 | Coleman |
| 4,085,368 A | 4/1978 | Yeh |
| 4,103,304 A | 7/1978 | Burnham et al. |
| 4,189,733 A | 2/1980 | Malm |
| 4,220,954 A | 9/1980 | Marchand |
| 4,225,870 A | 9/1980 | Marner et al. |
| 4,280,128 A | 7/1981 | Masak |
| 4,298,873 A | 11/1981 | Roberts |
| 4,308,541 A | 12/1981 | Seidel et al. |
| 4,313,116 A | 1/1982 | Powell et al. |
| 4,408,205 A | 10/1983 | Hockham |
| 4,584,581 A | 4/1986 | Teshirogi |
| 4,704,734 A | 11/1987 | Menich et al. |
| 4,803,492 A | 2/1989 | Inaba et al. |
| 4,814,777 A | 3/1989 | Monser |
| 4,821,039 A | 4/1989 | Crane |
| 4,849,992 A | 7/1989 | Alderman et al. |
| 5,068,668 A | 11/1991 | Tsuda et al. |
| 5,107,273 A | 4/1992 | Roberts |
| 5,117,236 A | 5/1992 | Chang et al. |
| 5,317,288 A | 5/1994 | Yung et al. |
| 5,377,035 A | 12/1994 | Wang et al. |
| 5,515,059 A | 5/1996 | How et al. |
| 5,517,686 A * | 5/1996 | Kennedy et al. .............. 455/273 |
| 5,568,158 A | 10/1996 | Gould |
| 5,600,333 A | 2/1997 | Justice et al. |
| 5,603,107 A | 2/1997 | Gottfried et al. |
| 5,710,995 A | 1/1998 | Akaiwa et al. |
| 5,818,385 A | 10/1998 | Bartholomew |
| 5,898,405 A | 4/1999 | Iwasaki |
| 5,909,191 A | 6/1999 | Hirshfield et al. |
| 5,999,138 A | 12/1999 | Ponce de Leon |
| 6,002,672 A | 12/1999 | Todd |
| 6,018,315 A | 1/2000 | Ince et al. |
| 6,064,865 A | 5/2000 | Kuo et al. |
| 6,087,986 A | 7/2000 | Shoki et al. |
| 6,121,925 A | 9/2000 | Hilliard |
| 6,125,109 A | 9/2000 | Fuerter |
| 6,144,339 A | 11/2000 | Matsumoto et al. |
| 6,172,970 B1 | 1/2001 | Ling et al. |
| 6,175,723 B1 | 1/2001 | Rothwell, III |
| 6,229,840 B1 | 5/2001 | Ichihara |
| 6,236,839 B1 | 5/2001 | Gu et al. |
| 6,271,798 B1 | 8/2001 | Endo et al. |
| 6,278,415 B1 | 8/2001 | Matsuyoshi et al. |
| 6,313,807 B1 | 11/2001 | Kolak |
| 6,314,127 B1 * | 11/2001 | Lynch et al. .................. 375/144 |
| 6,369,756 B1 | 4/2002 | Wang et al. |
| 6,388,621 B1 | 5/2002 | Lynch |
| 6,414,624 B2 | 7/2002 | Endo et al. |
| 6,449,469 B1 | 9/2002 | Miyahara |
| 6,456,257 B1 | 9/2002 | Zamat |
| 6,470,186 B1 | 10/2002 | Whikehart et al. |
| 6,480,526 B1 | 11/2002 | Shoki et al. |
| 6,486,828 B1 | 11/2002 | Cahn et al. |
| 6,535,168 B1 | 3/2003 | Marumoto et al. |
| 6,559,798 B1 | 5/2003 | Marumoto et al. |
| 6,563,860 B2 | 5/2003 | Schilling |
| 6,577,353 B1 * | 6/2003 | Welles et al. ................. 348/706 |
| 6,646,614 B2 | 11/2003 | Killen |
| 6,661,386 B1 | 12/2003 | Petros et al. |
| 6,731,940 B1 | 5/2004 | Nagendran |
| 6,768,457 B2 | 7/2004 | Lindenmeier |
| 6,816,116 B2 | 11/2004 | Chen |
| 6,831,611 B2 | 12/2004 | Ooe et al. |
| 6,867,739 B2 | 3/2005 | Prassmayer et al. |
| 6,885,349 B2 | 4/2005 | Hickel |
| 6,925,293 B2 | 8/2005 | Lindenmeier et al. |
| 6,952,587 B2 | 10/2005 | Whikehart et al. |
| 6,959,175 B2 | 10/2005 | Ohtaki |
| 6,977,611 B1 | 12/2005 | Crabb |
| 7,015,861 B2 | 3/2006 | Boyd et al. |
| 7,016,399 B1 | 3/2006 | Vadgama et al. |
| 7,075,485 B2 | 7/2006 | Song et al. |
| 7,088,104 B2 | 8/2006 | Bottomley |
| 7,099,415 B2 | 8/2006 | Ohsawa |
| 7,099,644 B2 | 8/2006 | Whikehart et al. |
| 7,113,748 B2 | 9/2006 | Shapira et al. |
| 7,119,751 B2 | 10/2006 | Li et al. |
| 7,126,553 B1 | 10/2006 | Fink et al. |
| 7,149,480 B2 | 12/2006 | Miyahara |
| 7,170,465 B2 | 1/2007 | Rofougaran |
| 7,200,368 B1 | 4/2007 | Hottinen et al. |
| 7,209,096 B2 | 4/2007 | Chau |
| 7,224,319 B2 | 5/2007 | Kubba et al. |
| 7,256,649 B2 | 8/2007 | Ksienski et al. |
| 7,308,020 B2 * | 12/2007 | Ishii et al. ...................... 375/148 |
| 7,310,503 B2 * | 12/2007 | Ido ................................... 455/140 |
| 7,345,626 B2 | 3/2008 | Smith et al. |
| 7,366,139 B2 | 4/2008 | Poegel et al. |
| 7,369,832 B2 | 5/2008 | Cho |
| 7,498,993 B1 | 3/2009 | Lee et al. |
| 7,522,899 B1 | 4/2009 | He |
| 7,545,333 B2 | 6/2009 | Li et al. |
| 7,564,407 B2 | 7/2009 | Yoshizoe et al. |
| 7,596,168 B2 | 9/2009 | Saito |
| 7,919,997 B2 | 4/2011 | Obkircher |
| 8,036,319 B2 | 10/2011 | Arambepola et al. |
| 8,385,868 B2 * | 2/2013 | Lee et al. ....................... 455/205 |
| 2003/0186660 A1 * | 10/2003 | Lee ................................ 455/140 |
| 2004/0130496 A1 | 7/2004 | Iijima et al. |
| 2004/0190065 A1 | 9/2004 | Shimizu |
| 2005/0117545 A1 | 6/2005 | Wittwer et al. |
| 2008/0119148 A1 | 5/2008 | Ray |
| 2008/0129616 A1 | 6/2008 | Li et al. |
| 2009/0042529 A1 * | 2/2009 | Lindenmeier et al. ...... 455/277.2 |
| 2010/0317306 A1 | 12/2010 | Lee et al. |
| 2010/0317309 A1 | 12/2010 | Lee et al. |
| 2012/0108178 A1 | 5/2012 | Lee et al. |

FOREIGN PATENT DOCUMENTS

| | | |
|---|---|---|
| EP | 1480367 A2 | 11/2004 |
| JP | 2004-328357 A | 11/2004 |

OTHER PUBLICATIONS

Chun-Ning Zhang et al., "A Low-Complexity Antenna Diversity Receiver Suitable for TDMA Handset Implementation", 1997, IEEE, pp. 1753-1757.

(56) References Cited

OTHER PUBLICATIONS

International Search Report for Application No. PCT/US2010/038673 dated Oct. 25, 2010, 4 pages.

International Search Report for Application No. PCT/US2010/038685 dated Oct. 28, 2010, 4 pages.

English language abstract and machine-assisted English translation for JP 2004-328357 extracted from the PAJ database on Mar. 14, 2014, 56 pages.

* cited by examiner

ANTENNA SYSTEM AND METHOD FOR OPTIMIZING AN RF SIGNAL

CROSS REFERENCE TO RELATED APPLICATIONS

This application claims priority to and the benefit of International Patent Application No. PCT/US2010/036669, filed on Jun. 15, 2010, which claims priority to U.S. Provisional Patent Application Nos. 61/268,662, 61/268,663, 61/268,665, 61/268,673, 61/268,674, and 61/268,689, each filed on Jun. 15, 2009 and each of which is hereby incorporated by reference.

BACKGROUND OF THE INVENTION

1. Field of the Invention

The subject invention relates to an antenna system and method for optimizing RF signal reception.

2. Description of the Related Art

A receiver performs most effectively when the RF signal it receives is optimized due to a high signal strength and low signal-to-noise ratio. When both the transmitting and receiving antennas are fixed, achieving an optimized RF signal may be accomplished by changing the directionality of one or both of the antennas. However, when either the transmitting or receiving antenna is in motion, such as a receiving antenna disposed on a vehicle or a transmitting antenna on a non-geosynchronous satellite, obtaining the optimized RF signal is more challenging.

One technique for obtaining an optimized RF signal involves combining by shifting the phase and/or adjusting the amplitude of multiple RF signals and supplying the resulting RF signal to the receiver, as this will change the electrical characteristics of the RF signal. However, the amount of phase shift and/or amplitude adjustment is variable based on any number of factors, including the distance between the transmitting and receiving antennas, the inclination angle of the antennas with respect to one another, the size of the antenna, and the type of antenna. To further complicate the challenge, multiple receiving antennas may also be utilized. Furthermore, switching noise and low signal strength at the receiver may result during the aforementioned process of obtaining the optimized RF signal.

The subject invention is directed to addressing the problems and challenges associated with the related art.

BRIEF SUMMARY AND ADVANTAGES

The subject invention defines an antenna system including a first antenna input for receiving a first RF signal from a first antenna and a second antenna input for receiving a second RF signal from a second antenna. The system includes an evaluation branch circuit having at least one evaluation signal conditioner electrically connected to one of the antenna inputs for changing an electrical characteristic of at least one of the RF signals. The evaluation branch circuit also has an evaluation combiner electrically connected to one of the at least one evaluation signal conditioner and at least one of another of the at least one evaluation signal conditioner, the first antenna input, and the second antenna input for combining at least two of the RF signals to produce an evaluation RF signal. The system further includes an implementation branch circuit separate from the evaluation branch circuit. The implementation branch circuit has at least one implementation signal conditioner electrically connected to one of the antenna inputs for changing an electrical characteristic of at least one of the RF signals. An implementation combiner is electrically connected to one of the at least one implementation signal conditioner and at least one of another of the at least one implementation signal conditioner, the first antenna input, and the second antenna input for combining at least two of the RF signals to produce an implementation RF signal. The system also includes a controller electrically connected to the evaluation combiner for receiving the evaluation RF signal from the evaluation combiner. The controller is in communicative control of the at least one evaluation signal conditioner to produce a plurality of evaluation RF signals, with each evaluation RF signal having different electrical characteristics. The controller analyzes the plurality of evaluation RF signals to determine an optimized evaluation RF signal from the plurality of evaluation RF signals. The controller is also in communicative control of the at least one implementation signal conditioner for changing the electrical characteristic of at least one of the RF signals based on the optimized evaluation RF signal to produce an optimized implementation RF signal.

The subject invention also defines a method of providing an optimized RF signal to a receiver where a first RF signal is received from a first antenna and a second RF signal is received from a second antenna. The method includes the step of changing an electrical characteristic of at least one of the RF signals in an evaluation branch circuit having multiple ways to produce a plurality of evaluation RF signals, where each evaluation RF signal has different electrical characteristics. The plurality of evaluation RF signals is received at a controller. The method also includes the step of analyzing the plurality of evaluation RF signals with the controller to determine an optimized evaluation RF signal. The method further includes the step of changing an electrical characteristic of at least one of the RF signals in an implementation branch circuit in accordance with the optimized evaluation RF signal determined by the controller.

By utilizing separate evaluation and implementation branch circuits, the system and method optimize the RF signal to the receiver without subjecting the receiver to multiple non-optimized RF signals. Furthermore, switching noise, which occurs when the electrical characteristics of the RF signals are altered, are reduced as the receiver is not subjected to constantly changing RF signals. As such, the receiver typically receives the optimized RF signal in terms of signal strength and signal-to-noise ratio.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, an antenna system 10 and method of optimizing a radio frequency (RF) signal for delivery to a receiver 12 are described herein.

Figure 1:
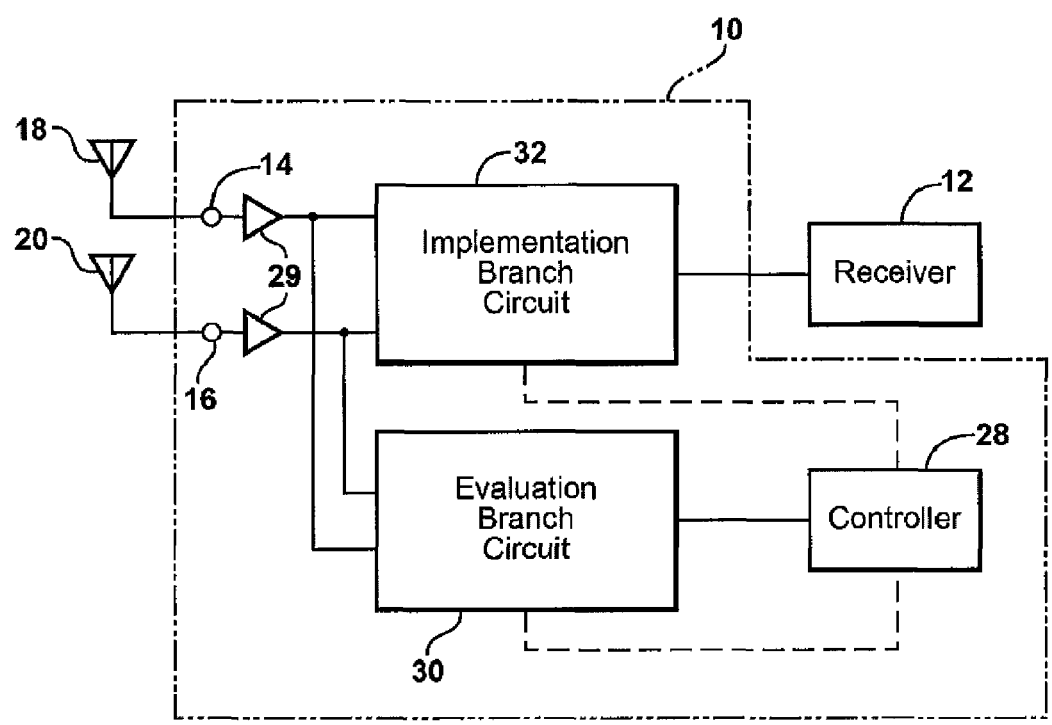
FIG. 1 is a block schematic diagram of an antenna system having an implementation branch circuit and an evaluation branch circuit.

Referring to FIG. 1, the antenna system 10 includes a first antenna input 14 for receiving a first RF signal and a second antenna input 16 for receiving a second RF signal. The RF signals, as known to those skilled in the art, are oscillating waveforms having a frequency between 3 Hz and 300 GHz. The RF signals in the illustrated embodiment are preferably transmitted through the air and carry information such as computerized data, audio signals, etc. as is also well known to those skilled in the art. Furthermore, the RF signals may be transmitted from terrestrial sources, from a satellite, or by other techniques known to those skilled in the art. Moreover, although the antenna system 10 utilizes inputs 14, 16 for receiving RF signals, the system 10 may be alternatively utilized to transmit RF signals via multiple outputs (not shown). However, for ease in description purposes, the system 10 will be described hereafter as receiving RF signals. Furthermore, the antenna system 10 may also include additional antenna inputs to receive additional RF signals.

Figure 2:
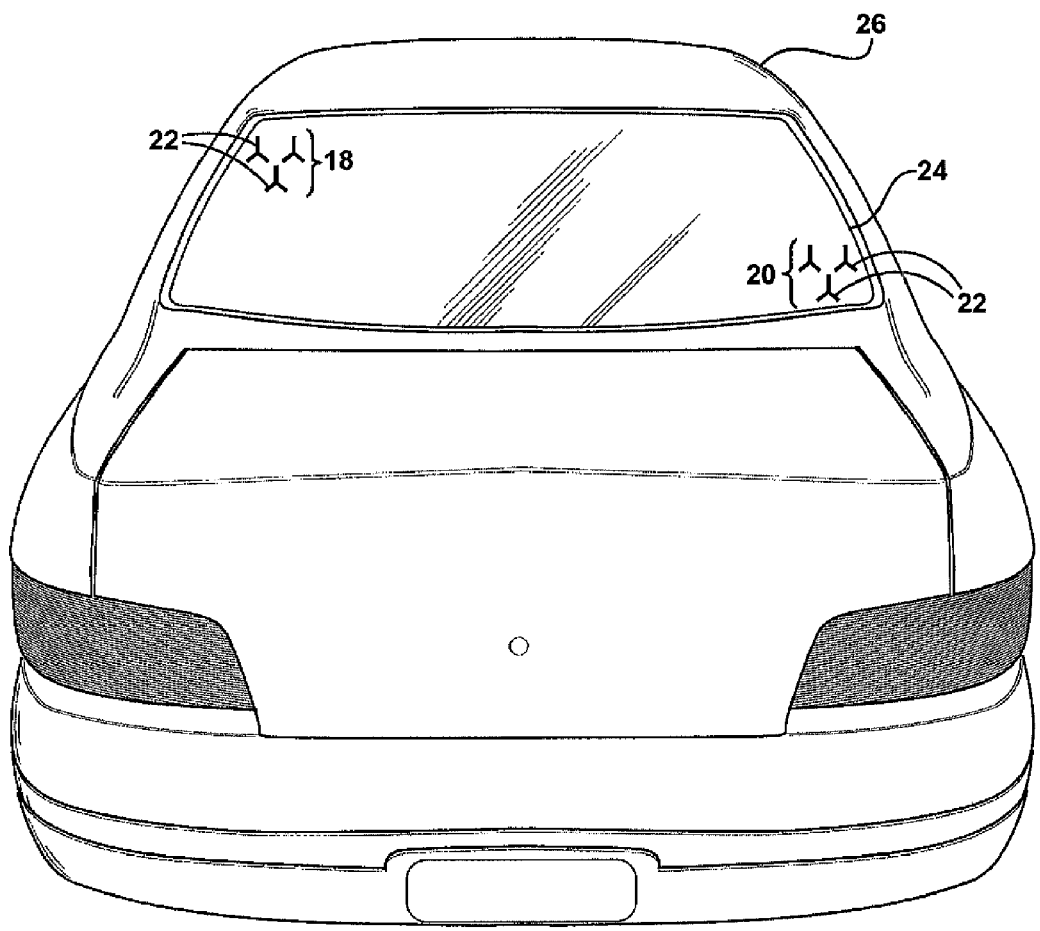
FIG. 2 is a perspective view of a vehicle showing a first antenna group and a second antenna group disposed on a window.

In the illustrated embodiments, the first antenna input 14 is electrically connected to a first antenna group 18 which provides the first RF signal and the second antenna input 16 is electrically connected to a second antenna group 20 which provides the second RF signal. As shown in FIG. 2, each antenna group 18, 20 includes a plurality of antenna elements 22 for receiving the RF signals. The antenna groups 18, 20 are also commonly referred to as antenna arrays by those skilled in the art. However, in alternative embodiments (not shown) the antenna inputs 14, 16 may be connected to single antenna elements 22.

In the embodiment shown in FIG. 2, the antenna groups 18, are disposed on one or more windows 24 of a vehicle 26. Accordingly, the antenna elements 22 of the antenna groups 18, 20 are also disposed on the window(s) 24. The antenna elements 22 are formed of a conductive material, such as, but not limited to, copper or silver. The antenna elements 22 may be shaped as patches, strips, wires, or any other suitable form as known to those skilled in the art.

Referring again to FIG. 1, the antenna system 10 includes a controller 28 for controlling operation of the system 10. The controller 28 is preferably implemented as a microprocessor, a microcontroller, a field programmable gate array (FPGA), a combination of discrete logic devices, or other suitable circuitry able to store and perform computations of data. Such microprocessors and microcontrollers are widely available and well known to those skilled in the art. Furthermore, a plurality of devices may be implemented in communication with one another to implement the controller 28. The functions and capability of the controller 28 will be described in greater detail below.

Figure 3:
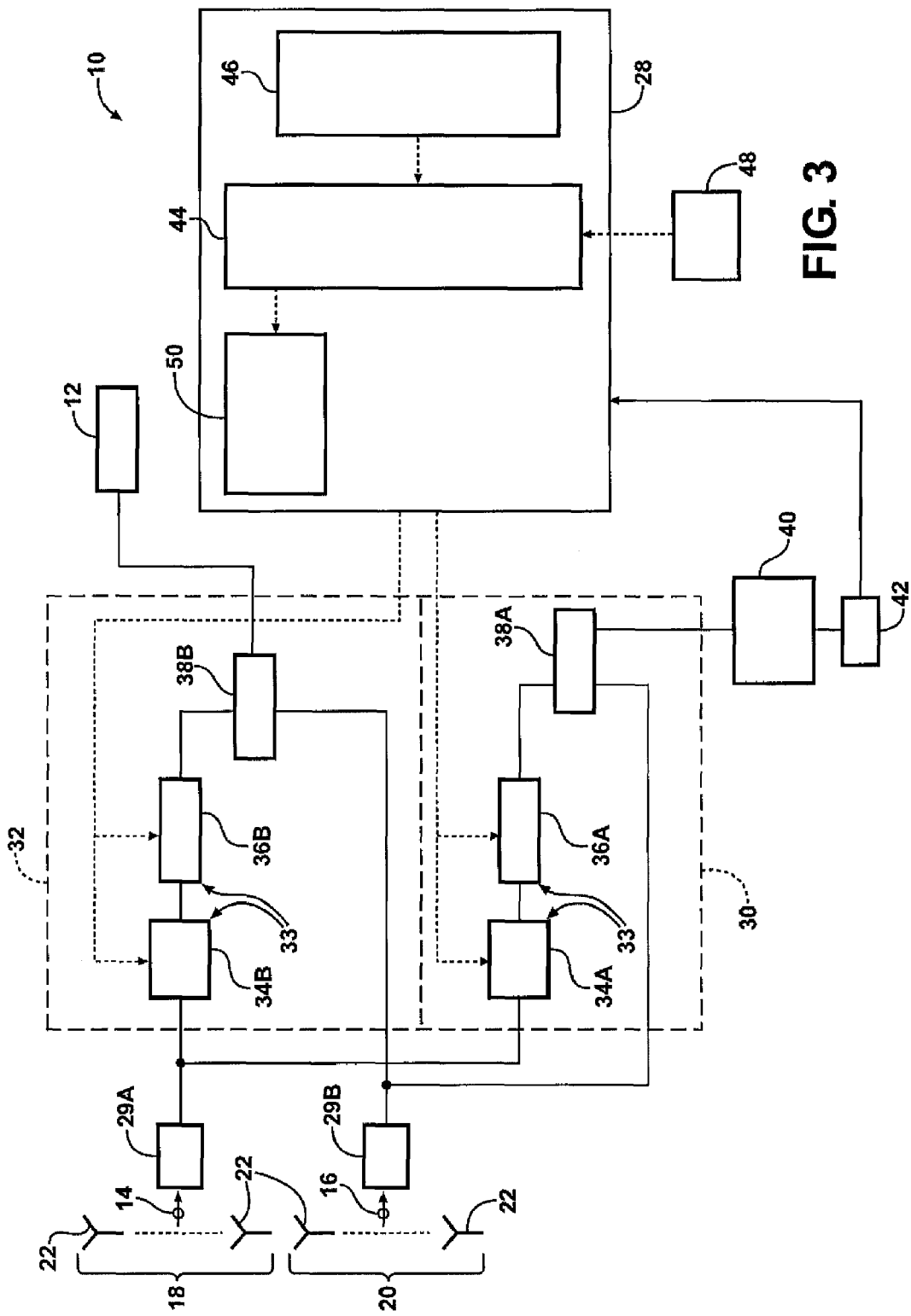
FIG. 3 is a block schematic diagram of a first embodiment of the system with one phase shift circuit and one attenuator in each branch circuit.
Figure 4:
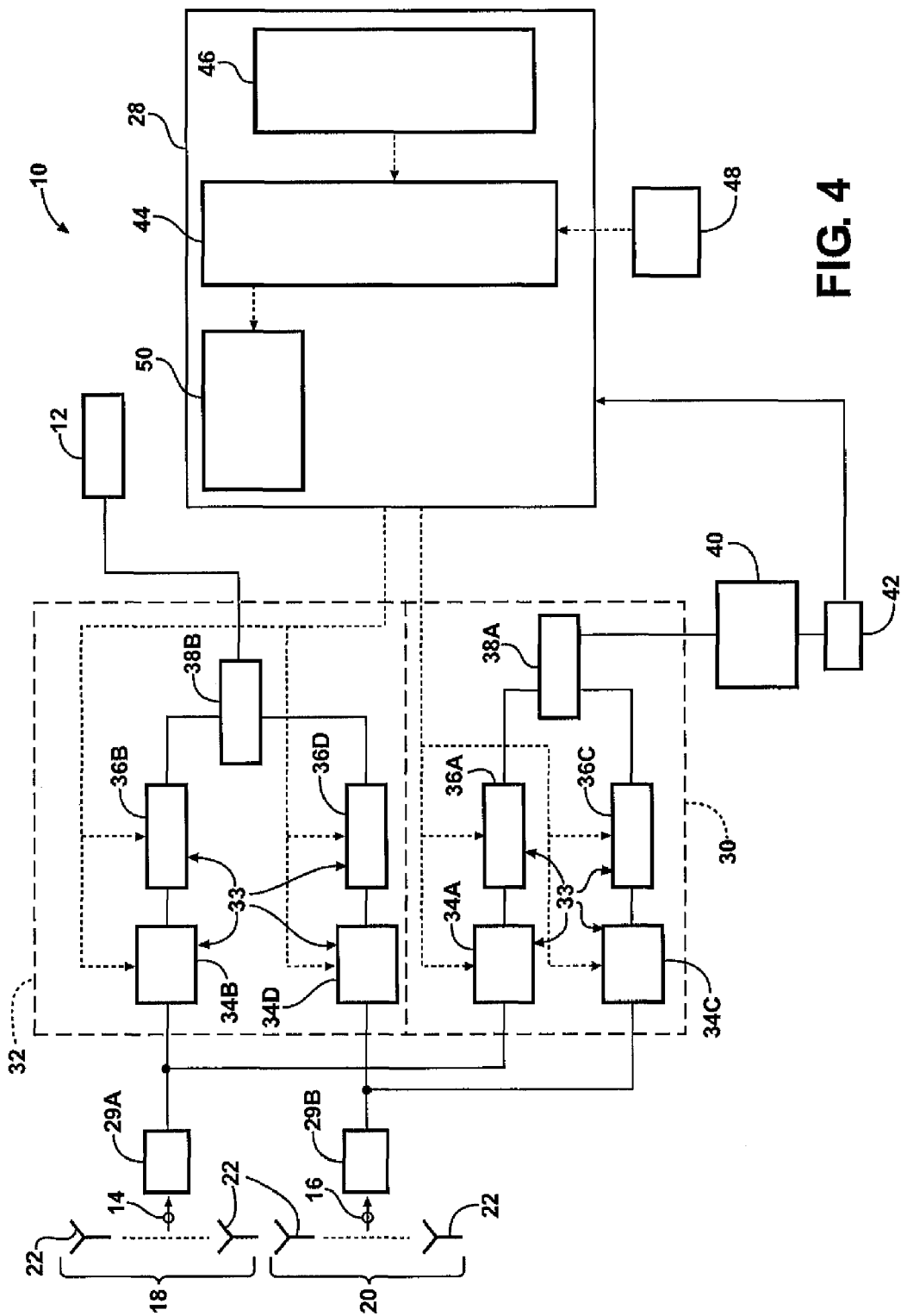
FIG. 4 is a block schematic diagram of a second embodiment of the system with two phase shift circuits and two attenuators in each branch circuit.

One or more amplifiers 29 may be utilized in conjunction with the system 10. Each amplifier 29 is electrically connected to one of the antenna inputs 14, 16. In first and second embodiments, as shown in FIGS. 3 and 4 respectively, the amplifiers 29 are implemented as a first amplifier 29A electrically connected to the first antenna input 14 and a second amplifier 29B electrically connected to the second antenna input 16. The amplifiers 29 each amplify the RF signal received from corresponding antenna group 18, 20. Said another way, each amplifier 29 increases the signal strength of each RF signal. The amplifiers 29 are preferably low-noise amplifiers (LNAs), however, other types may be utilized as well known to those skilled in the art. Furthermore, multiple amplifiers 29 may be electrically connected in series (not shown) and electrically connected to one of the antenna inputs 14, 16.

With reference to FIG. 1, the antenna system 10 includes an evaluation branch circuit 30 and an implementation branch circuit 32. The receiver 12 is electrically connected to the implementation branch circuit 30 such that the implementation branch circuit 32 provides the RF signal that is supplied to the receiver 12. The evaluation branch circuit 30 is utilized to determine an optimized RF signal as described below. Each branch circuit 30, 32 is electrically connected to both of the antenna inputs 14, 16. Specifically, in the illustrated embodiments, each branch circuit 30, 32 is electrically connected to an output (not numbered) of each of the amplifiers 29. As such, both the implementation branch circuit 32 and the evaluation branch circuit 30 utilize both the first and second RF signals received from the first and second antenna groups 18, 20. However, the implementation branch circuit 32 is separate from the evaluation branch circuit 30. That is, although the branch circuits 30, 32 each contain the same or similar components (as described below), the implementation branch circuit 32 is electrically connected to the receiver 12, while the evaluation branch circuit 30 is not connected to the receiver 12.

Referring now to FIGS. 3 and 4, each branch circuit 30, 32 includes at least one signal conditioner 33 electrically connected to one of said antenna inputs 14, 16 for changing an electrical characteristic of at least one of the RF signals. In the illustrated embodiments, the at least one signal conditioner 33 is implemented with a phase shifter 34 and an attenuator 36 as described in greater detail below. However, those skilled in the art realize other configurations, quantities, and types of suitable signal conditioners 33 other than those described herein.

Still referring to FIGS. 3 and 4, the circuits 30, 32 each include at least one phase shifter 34. The at least one phase shifter 34 is in communication with one of the first antenna input 14 and the second antenna input 16. That is, one phase shifter 34 may be in communication with either the first antenna input 14 or the second antenna input 16. Further, multiple phase shifters 34 may be utilized such that one phase shifter 34 is in communication with to the first antenna input 14 and another phase shifter 34 is in communication with to the second antenna input 16.

The at least one phase shifter 34 receives the RF signal from each of the connected antenna inputs 14, 16. The phase shifter 34 shifts the phase of the received RF signal to generate a phase-shifted RF signal. Said another way, the phase shifter 34 provides a time delay to the received RF signal to generate the phase-shifted RF signal. The at least one phase shifter 34 is also in communication with the controller 28. Specifically, the controller 28 may control the amount of phase shift, or time delay, that is applied to the RF signal received from the antenna inputs 14, 16.

In the first embodiment of the system 10, as shown in FIG. 3, the evaluation branch circuit 30 includes a first evaluation phase shifter 34A electrically connected to an output (not numbered) of the first amplifier 29A. Likewise, the implementation branch circuit 32 includes a first implementation phase shifter 34B also electrically connected to the output of the first amplifier 29A.

In a second embodiment, as shown in FIG. 4, the evaluation branch circuit 30 includes the first evaluation phase shifter 34A and the first implementation phase shifter 34B electrically connected to the first amplifier 29A. Additionally, a second evaluation phase shifter 34C and a second implementation phase shifter 34D are electrically connected to an output (not numbered) of the second amplifier 29B.

The circuits 30, 32 may also include the attenuator 36 as one of the at least one signal conditioner 33. Each attenuator 36 attenuates one of the RF signals. That is, the attenuators 36 each reduce the signal strength of the RF signal. Each attenuator 36 is in communication with the controller 28 such that the controller 28 may control the amount or level of attenuation in each attenuator 36. Said another way, the controller 28 manages how much signal strength is reduced by each attenuator 36. By attenuating one or more of the RF signals, the controller 28 optimizes the combined RF signal delivered to the receiver 12, as described in more detail below.

Preferably, the at least one attenuator 36 is electrically connected to an output (not numbered) of the at least one phase shifter 34. However, other connection locations for the at least one attenuator 36 will be realized by those skilled in the art.

In the first embodiment, as shown in FIG. 3, the at least one attenuator 36 is implemented as a first attenuator 36A electrically connected to the first phase shifter 34A as part of the evaluation branch circuit 30 and a second attenuator 36B electrically connected to the second phase shifter 34B as part of the implementation branch circuit 32. In the second embodiment, in addition to the first and second attenuators 36A, 36B, the evaluation branch circuit 30 includes a third attenuator 36C electrically connected to the third phase shifter 34C and the implementation branch circuit 32 includes a fourth attenuator 36D electrically connected to the fourth phase shifter 34D.

The system 10 also includes at least two combiners 38. Specifically, the system 10 includes an evaluation combiner 38A, as part of the evaluation branch circuit 30, and an implementation combiner 38B, as part of the implementation branch circuit 32. Each combiner 38A, 38B has at least two inputs (not numbered) for receiving RF signals and an output. A first input of each combiner 38A, 38B is electrically connected to one of the at least one phase shifter 34 or attenuator 36. A second input of the combiner 38 is electrically connected to at least one of another of the at least one phase shifter 34, another of the attenuator 36, the first antenna input 14, or the second antenna input 16. That is, the second input of the combiner 38 is electrically connected to one of the phase shifters 34, the first antenna input 14, or the second antenna input 16. The evaluation combiner 38A combines the RF signals received from the inputs and delivers an evaluation RF signal to the output. Likewise, the implementation combiner 38B combines the RF signals received from the inputs and delivers an implementation RF signal to the output. The output of the implementation combiner 38B is connected solely to the receiver 12. Said another way, the output of the implementation combiner 38B is electrically isolated from the controller 28.

In the first embodiment, the first input of the evaluation combiner 38A is electrically connected to the first attenuator 36A and the second input is electrically connected to the second amplifier 29B. The first input of the implementation combiner 38B is electrically connected to the second attenuator 36B and the second input is also electrically connected to the second amplifier 29B.

In the second embodiment, the inputs of evaluation combiner 38A are electrically connected to the first attenuator 36A and the third attenuator 36C. The inputs of the implementation combiner 38B are electrically connected to the second attenuator 36B and the fourth attenuator 36D.

The output of the evaluation combiner 38A is in communication with the controller 28. The controller 28 then evaluates the evaluation RF signal. More specifically, the controller 28 changes the electrical characteristics of the RF signals in the evaluation branch circuit 30, at a plurality of different levels. This is done to find an optimized evaluation RF signal. In the illustrated embodiments, changing the electrical characteristics of the RF signals is accomplished by changing the amount of phase shift generated by the at least one phase shifter 34 and/or the amount of attenuation by the attenuators 36. For example, the RF signal may be phase shifted by 2.5°, 5°, 7.5°, 10°, and so on, to generate a plurality of evaluation RF signals. As another example, the RF signal may be attenuated by 0.5 dB, 1 dB, etc., to generate the plurality of evaluation RF signals. Of course, the RF signal may be phase shifted and attenuated at a plurality of different levels to generate a plurality of unique evaluation RF signals.

The controller 28 may implement a null steering technique to optimize the evaluation RF signal, and thus also optimize the implementation RF signal delivered to the receiver 12. As stated above, controller 28 is in communication with each phase shifter 34 and attenuator 36 for controlling operation of the phase shifters 34 and attenuators 36. Specifically, the controller 28 may increase or decrease the amount of attenuation provided by the attenuators 36 on each RF signal. That is, the controller 28 may increase or decrease the signal strength of each RF signal. The controller 28 may also change the phase shift on the RF signals. The system 10 may also include additional amplifiers (not shown) in-line with the phase shifters 34. These amplifiers may be utilized in addition to, or as an alternative, to the attenuators 36. These amplifiers are in communication with the controller 28 for increasing or decreasing the signal strength of each RF signal.

The controller 28 controls the signal strength and/or phase shift of the signals in an attempt to reduce interference from undesired RF signals. For instance, if the receiver 12 is tuned to a desired RF signal on a certain frequency, interference from other nearby signals at different frequencies can often cause interference to the desired RF signal. Furthermore, distant signals at the certain frequency can also cause interference to the desire RF signal. As such, the controller 28, by adjusting the signal strength and/or phase shift of the RF signals received by the antennas 22, steers a null in the radiation pattern to mitigate the interference. This is accomplished by analyzing the signal-to-noise ratio (SNR) of each signal received by the controller 28. Phase adjustments may be made to the phase shifters 36 to determine the best SNR at the frequency of the desired RF signal.

Once the optimized evaluation RF signal is found, the controller 28 changes the electrical characteristics of the RF signal in the implementation branch circuit 32 to match those of the optimized evaluation RF signal found by the evaluation branch circuit 30. As such, the implementation RF signal delivered to the receiver 12 is optimized. By using this technique, i.e., using separate branch circuits 30, 32, the receiver 12 receives an optimized RF signal from the implementation branch circuit 32 without being subjected to a plurality of non-optimized RF signals of the evaluation branch circuit 30. Furthermore, switching noise to the receiver 12 is reduced, as the RF signal delivered to the receiver 12 is not switching through the plurality of different electrical characteristics in order to find the optimized RF signal. The evaluation branch circuit 30 may routinely or continuously cycle through the plurality of different electrical characteristics in order to find the optimized RF signal, while the implementation branch circuit 32 utilizes the electrical characteristics associated with the last known optimized RF signal.

In the illustrated embodiments, the system 10 includes a signal strength identifier 40. The signal strength identifier 40 is electrically connected to the evaluation combiner 38A to determine the signal strength of the evaluation RF signal generated by the evaluation combiner 38A. In the illustrated embodiment, the signal strength identifier 40 outputs an analog signal that corresponds with the signal strength of the evaluation RF signal. An analog-to-digital converter (ADC) 42 is electrically connected to the controller 28, such that the controller 28 receives the signal strength as a digital value. Those skilled in the art realize that the signal strength identifier 40 and/or the ADC 42 may be integrated with the controller 28.

The controller 28 preferably includes a parameter bank 44 for storing a plurality of possible electrical characteristics used in controlling the signal conditioners 33. Specifically, the parameter bank 44 stores a plurality of possible phase and amplitude settings used in controlling the phase shifters 34 and the attenuators 36. The possible phase and amplitude settings in the parameter bank 44 may be reduced into a plurality of preferred phase and amplitude settings based on a custom parameter set, such as the number of antenna elements 22 used, location of the antenna elements 22 on the vehicle, and type of vehicle used. A custom parameter bank 46 stores this custom parameter set. The possible phase and amplitude settings may also be narrowed by real-time information from a global positioning system (GPS) receiver 48, which is in communication with the controller 28. The preferred phase and amplitude settings are stored in a weighted parameter bank 50. The banks 44, 46, 50 are typically memory locations in a memory (not shown) of the controller 28. These banks 44, 46, 50 may also be referred to as databases by those skilled in the art.

Generally, the controller 28 cycles through and implements all of the preferred phase and amplitude settings stored in the weighted parameter bank 50 within the evaluation branch circuit 30. The signal strength identifier 40 measures the signal strength of the evaluation RF signal corresponding to the preferred phase and amplitude setting implemented. The controller 28 stores and compares the signal strength corresponding to the preferred phase and amplitude settings implemented in the evaluation branch circuit 30 and determines the preferred phase and amplitude setting that results in the strongest signal strength. The controller 28 then implements the preferred phase and amplitude setting determined to result in the strongest signal strength within the implementation branch circuit 32 for ensuring the receiver 12 is provided with the signal with the strongest possible signal strength.

Figure 5:
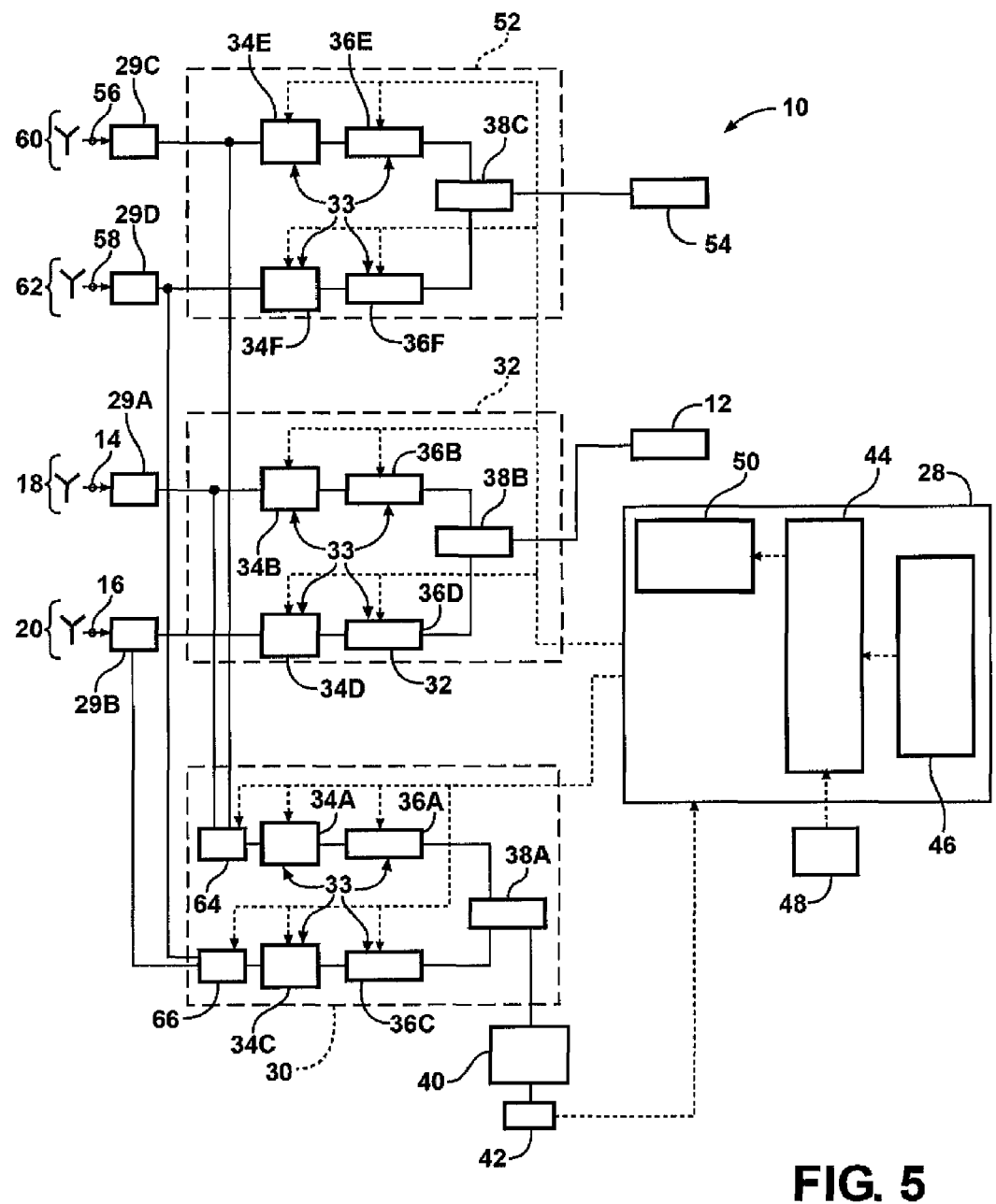
FIG. 5 is a block schematic diagram of a third embodiment of the system with an additional implementation branch circuit.

A third embodiment of the system 10, as shown in FIG. 5, builds on the second embodiment, by implementing an additional implementation branch 52 for supplying a combined RF signal to an additional receiver 54. As such, the receiver 12 accommodates a first radio-based service while the additional receiver 54 accommodates a second radio-based service. For instance, the first radio-based service may be terrestrial radio, while the second radio-based service may be the global positioning system. Other suitable radio-based services include, but are not limited to, satellite radio (e.g., SDARS) or cellular telephone service.

The third embodiment of the system also preferably includes a third antenna input 56 and a fourth antenna input 58. The third antenna input 56 is electrically connected to a third antenna group 60 which provides a third RF signal and the fourth antenna input 58 is electrically connected to a fourth antenna group 62 which provides a fourth RF signal. A third amplifier 29C is electrically connected to the third antenna input 56 and a fourth amplifier 29D electrically connected to the fourth antenna input 58. The additional implementation branch 52 is electrically connected to the third and fourth inputs 56, 58.

The additional implementation branch of the third embodiment is electrically connected to the third and fourth amplifiers 29C, 29D, and thus in communication with the third and fourth antenna groups 56, 58. Specifically, the additional implementation branch 52 includes a fifth phase shifter 34E, a sixth phase shifter 34F, a fifth attenuator 36E, a sixth attenuator 36F, and a third combiner 38C. The fifth phase shifter 34E is electrically connected to the third amplifier 29C for receiving and phase-shifting the third RF signal. The sixth phase shifter 34F is electrically connected to the fourth amplifier 29D for receiving and phase-shifting the fourth RF signal. The fifth attenuator 36E is electrically connected to the fifth phase shifter 34E for receiving and attenuating the third RF signal. The sixth attenuator 36F is electrically connected to the sixth phase shifter 34F for receiving and attenuating the fourth RF signal. One input of the third combiner 38C is electrically connected to the fifth phase shifter 34E or the fifth attenuator 36E for receiving the third RF signal while the other input of the third combiner 38C is electrically connected to the sixth phase shifter 34F or the sixth attenuator 36F for receiving the fourth RF signal. The additional receiver 54 is electrically connected to an output of the third combiner 38C.

In the third embodiment, the at least one signal conditioner 33 of the evaluation branch circuit 30 is electrically connectable to either the first and second RF signals or the third and fourth RF signals. Specifically, the evaluation branch circuit 30 includes a first switch 64 and a second switch 66. The first switch 64 is electrically connected to both the first amplifier 29A and the third amplifier 29C and, accordingly, outputs either the first RF signal or the third RF signal. The second switch 66 is electrically connected to both the second amplifier 29B and the fourth amplifier 29D and, accordingly, outputs either the second RF signal or the fourth RF signal. Both switches 64, 66 are preferably controlled in unison such that the at least one signal conditioner 33 utilizes either the first and second RF signals or the third and fourth RF signals.

In operation, the evaluation branch circuit 30 evaluates the first and second RF signals associated with the implementation branch circuit 32 at a plurality of conditions and then switches to evaluate the third and fourth RF signals associated with the additional implementation branch circuit 52 at a plurality of conditions. As such, the evaluation branch circuit 30 of the third embodiment may be utilized to evaluate RF signals for a plurality of implementation branch circuits 32, 52 without the need for additional evaluation branch circuits.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:
1. An antenna system comprising:
a first antenna input for receiving a first RF signal from a first antenna;
a second antenna input for receiving a second RF signal from a second antenna;
an evaluation branch circuit including
at least one evaluation signal conditioner electrically connected to one of said antenna inputs for changing an electrical characteristic of at least one of the RF signals, and an evaluation combiner electrically connected to one of said at least one evaluation signal conditioner and at least one of another of said at least one evaluation signal conditioner, said first antenna input, and said second antenna input for combining at least two of the RF signals to produce an evaluation RF signal, an implementation branch circuit separate from said evaluation branch circuit, said implementation branch circuit including at least one implementation signal conditioner electrically connected to one of said antenna inputs for changing an electrical characteristic of at least one of the RF signals, and an implementation combiner electrically connected to one of said at least one implementation signal conditioner and at least one of another of said at least one implementation signal conditioner, said first antenna input, and said second antenna input for combining at least two of the RF signals to produce an implementation RF signal; and a controller electrically connected to said evaluation combiner for receiving the evaluation RF signal from said evaluation combiner;

said controller in control of said at least one evaluation signal conditioner to produce a plurality of evaluation RF signals, each evaluation RF signal having different electrical characteristics;

said controller analyzing the plurality of evaluation RF signals to determine an optimized evaluation RF signal from the plurality of evaluation RF signals; and said controller in communicative control of said at least one implementation signal conditioner to change the electrical characteristic of at least one of the RF signals based on the optimized evaluation RF signal to produce an optimized implementation RF signal.

2. An antenna system as set forth in claim 1 wherein said at least one evaluation signal conditioner is further defined as an evaluation phase shifter for shifting a phase of the evaluation RF signal and said at least one implementation signal conditioner is further defined as an implementation phase shifter for shifting a phase of the implementation RF signal.

3. An antenna system as set forth in claim 2 wherein said controller directs said at least one evaluation phase shifter through a plurality of phase shifts and evaluates the evaluation RF signal from said evaluation combiner at each of the plurality of phase shifts to determine the optimized evaluation RF signal.

4. An antenna system as set forth in claim 2 wherein said at least one evaluation phase shifter is further defined as a first evaluation phase shifter electrically connected to said first antenna input and a second evaluation phase shifter electrically connected to said second antenna input.

5. An antenna system as set forth in claim 4 wherein said evaluation combiner is electrically connected to said first evaluation phase shifter and said second evaluation phase shifter.

6. An antenna system as set forth in claim 2 wherein said at least one implementation phase shifter is further defined as a first implementation phase shifter electrically connected to said first antenna input and a second implementation phase shifter electrically connected to said second antenna input.

7. An antenna system as set forth in claim 6 wherein said implementation combiner is electrically connected to said first implementation phase shifter and said second implementation phase shifter.

8. An antenna system as set forth in claim 1 further comprising:

a first amplifier electrically connected between said first antenna input and both said evaluation branch circuit and said implementation branch circuit; and a second amplifier electrically connected between said second antenna input and both said evaluation branch circuit and said implementation branch circuit.

9. An antenna system as set forth in claim 1 wherein:

said at least one evaluation signal conditioner is further defined as at least one evaluation attenuator; and said at least one implementation signal conditioner is further defined as at least one implementation attenuator.

10. An antenna system as set forth in claim 9 wherein said controller is in control of said at least one evaluation attenuator and said at least one implementation attenuator for evaluating the evaluation RF signal from said evaluation combiner to determine the optimized evaluation RF signal and adjusting the attenuation provided by said at least one implementation attenuator based on the optimized evaluation RF signal to produce the optimized implementation RF signal.

11. An antenna system as set forth in claim 1 wherein an output of said implementation combiner is electrically connected to a receiver.

12. An antenna system as set forth in claim 1 wherein said controller includes a database for storing a plurality of possible electrical characteristics used in controlling said signal conditioners.

* * * * *